US005529858A

United States Patent [19]
Wicker et al.

[11] Patent Number: 5,529,858
[45] Date of Patent: Jun. 25, 1996

[54] HERMETICALLY SEALED THERMOCOMPRESSION FEEDTHROUGH AND PERIPHERAL SEAL FOR HIGH TEMPERATURE LITHIUM BASED BATTERY APPLICATIONS

[75] Inventors: Alain Wicker, Paris, France; Salah M. Oweis, Ellicot City, Md.; Alain Petitbon, Saint Arnoult Enyvelines; Fernand Grivon, Saint Michel Sur Orges, both of France; Khushrow K. Press, Baltimore, Md.

[73] Assignee: Saft America, Inc., Valdosta, Ga.

[21] Appl. No.: 328,299

[22] Filed: Oct. 24, 1994

[51] Int. Cl.⁶ .......................... H01M 2/02; H01M 10/36
[52] U.S. Cl. .................... 429/149; 429/112; 429/172; 429/173; 429/174; 429/218; 429/185
[58] Field of Search .................... 429/172, 171, 429/173, 174, 218, 149, 185

[56] References Cited

U.S. PATENT DOCUMENTS

| | | | |
|---|---|---|---|
| 4,037,027 | 7/1977 | Desplanches et al. | 429/104 |
| 4,049,889 | 9/1977 | Heintz | 429/174 |
| 4,061,841 | 12/1977 | Sharma et al. | 429/112 |
| 5,162,172 | 11/1992 | Kaun | 429/155 |
| 5,279,909 | 1/1994 | Hosner et al. | 429/184 |

*Primary Examiner*—John S. Maples
*Assistant Examiner*—Richard H. Lilley, Jr.
*Attorney, Agent, or Firm*—Sughrue, Mion, Zinn, Macpeak & Seas

[57] ABSTRACT

A design and process for making hermetically sealed thermocompression feedthrough and peripheral seal for high temperature Li Alloy $FeS_x$ battery cells and battery enclosures. The selected materials and processes parameters are developed to match the high temperature Li Alloy/$FeS_x$ system.

11 Claims, 1 Drawing Sheet

HERMETICALLY SEALED THERMOCOMPRESSION FEEDTHROUGH AND PERIPHERAL SEAL FOR HIGH TEMPERATURE LITHIUM BASED BATTERY APPLICATIONS

BACKGROUND OF THE INVENTION

The present invention is directed to cell and battery enclosures. A design and process are introduced for making a hermetically sealed thermocompression feedthrough and a peripheral seal for high temperature lithium-based battery applications.

It is necessary to provide an electrical feedthrough in electrochemical cell and battery enclosures, and it has been known to use ceramic-to-metal/ceramic techniques which are largely based on brazing principles and ceramic surface metallization, or compact powder techniques which are economical in fabrication costs which do not provide adequate hermeticity for high-temperature lithium-based battery applications. Accordingly, it is a goal of the present invention to provide an improved seal for the electrical feedthrough for a lithium-based electrochemical cell and battery enclosures.

U.S. Pat. No. 4,037,027 to Desplanches et al describes the use of thermocompression for making a seal between a metallic container and an α-Alumina ring for a sodium-sulphur high temperature cell. However, the technique and materials disclosed are not effective for lithium-based cells.

A peripheral seal provides a container for the cell electrochemistry and makes bipolar stacks of cells viable. The seal has to be a good electrical insulator at the cell high operating temperature (400°–500° C.), chemically stable at this high temperature, must match the thermal expansion of the cell components, have strong mechanical bonding to metals and/or ceramics, and provide a barrier to molten salt. Accordingly, it is a goal of the present invention to provide an improved peripheral seal for a lithium-based electrochemical battery applications.

SUMMARY OF THE INVENTION

Briefly, the present invention resides in a design and process for achieving a hermetically sealed thermocompression feedthrough and a peripheral seal, suitable for use in both high temperature lithium based cells and for battery enclosures, wherein the materials and process parameters are developed to match the Li Alloy/$FeS_x$ system. Thermocompression, a solid state bonding technique which is different from other ceramic-to-metal/ceramic techniques which are largely based on brazing principles and ceramic surface metallization, is used in the case of a cell feedthrough to join the cell cover to an insulating ceramic ring and current collector/terminal assembly.

BRIEF DESCRIPTION OF THE DRAWINGS

The invention will be more clearly understood from the following description in conjunction with the accompanying drawings, in which.

DETAILED DESCRIPTION OF THE INVENTION

Figure 1:
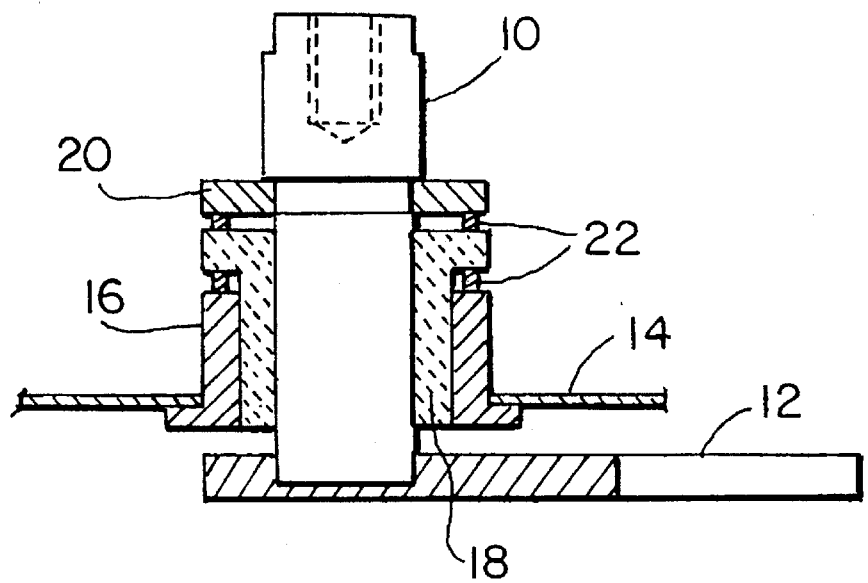
FIG. 1 is cross-sectional view of one example of a hermetically-sealed thermocompression feedthrough according to the present invention.

With reference first to FIG. 1 which shows an illustrative thermocompression hermetically sealed feedthrough, an electrical terminal 10 coupled to an electrical distribution plate 12 in a known manner is shown extending through a cell cover 14. A stainless steel bushing 16 is welded to the cell cover 14, and a bushing 18 of high density, high purity MgO, AlN or ceramic material chemically compatible to the LiAl/$FeS_x$ chemistry (i.e., it will not be corrosive or corroded by the cell chemistry at the cell high operating temperature), is provided internally of the bushing 16 to ensure electrical insulation of the terminal 10 and distribution plate 12 from the cell cover 14. The ceramic bushing 18 is thermocompression bonded to a collar 20, which is welded to (or forms one part with) terminal 10, and is also thermocompression bonded to the stainless steel bushing 16 welded to cell cover 14, to provide hermetic sealing and adequate mechanical strength in the joint. The thermocompression bonding is via metal rings (wire or foil) 22 which undergo plastic deformation under pressure and heat. Metal materials suitable for use as the thermocompression rings 22 include (but are not limited to) aluminum, gold and nickel. Parameters for thermocompression processing, including temperature, pressure, and the processing environment selected according to the materials involved in the thermocompression-bonded joint, are controlled to match the Li Alloy/$FeS_x$ system.

All materials are selected to be compatible with cell chemical components at the high operating temperature of the cell. Tolerances of components 10, 16 and 18 are selected to allow good fit at high operating temperature without excessive loading of the ceramic bushing 18.

Surface roughness of about 25 microinch 'Ra' and flatness of about 0.010 inch of the flat surfaces of the ceramic bushing flange is preferred. Also, adequate parallelism of these two surfaces of about 0.002 inch is preferred for the thermocompression bonding to avoid breakage of the ceramic bushing.

Figure 2:
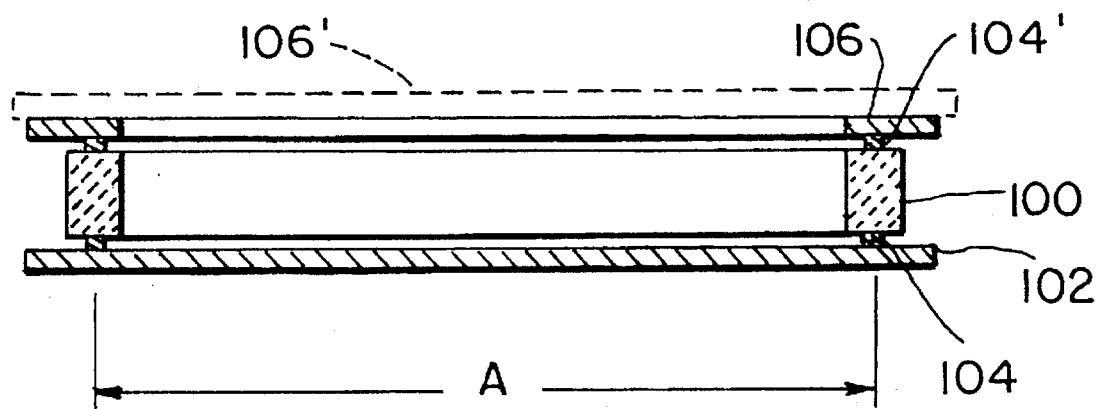
FIG. 2 is a side sectional view of one example of a thermocompression hermetic peripheral seal for a bipolar LiAl/$FeS_x$ cell according to this invention.

FIG. 2 shows an illustrative thermocompression hermetic peripheral seal for a bipolar LiAl/$FeS_x$ cell. The ceramic high density, high purity ring 100 is bonded to a bottom current collector 102 by metal ring (e.g., wire or foil) 104. A top metal ring 106 is also thermocompression bonded to the ceramic ring 100 by another ring 104'. The cell chemical components, the Li Alloy anode, the electrolyte (alkali and alkaline earth metal salts and mixtures of them), and $FeS_x$ cathode are put inside this seal envelope and then fully sealed by welding a top current collector 106' to the metal ring 106. The anode side current collector may be, for illustrative purposes only, 1010 steel or stainless steel while the cathode side collector may be Mo or a suitable substrate which is electrically conductive, weldable and chemically compatible with the cell chemistry, e.g., 1010 steel coated with TiN, WC or Mo by way of example only. All materials and/or coatings are to be compatible with cell chemical components at the high operating temperatures of the cell. The flat surfaces of the ceramic ring are to be flat, parallel, and have surface roughness similar to the ceramic bushing of the feedthrough design mentioned above. The top current collector 106' could be the bottom of the top cell in a bipolar stack of cells, i.e., cells can be welded together.

In a first example of a joint according to the present invention, a stainless steel ring/Aluminum wire ring/MgO ceramic disc thermocompression bonded joint was made at average temperature of 622° C. and under a pressure of 160 kg/cm$^2$ (2276 psi) for 30 minutes, in a dynamic primary vacuum. The joint was hermetic to 3×10$^{-6}$ SCC/S in a helium leak check. A second example was the same as the first, except that after fabrication the joint was heated to 500° C. and kept for 12 hours in air, cooled down to room temperature and helium leak checked to give 10$^{-9}$ SCC/S. In a third example, a double thermocompression bonded joint was formed of a stainless steel ring/Aluminum wire ring/ MgO ceramic disc/Aluminum wire/stainless steel ring structure, and this was processed at the same conditions but kept for 60 minutes under pressure. Helium leak tightness was 10$^{-8}$ SCC/S on one side and less than 10$^{-6}$ SCC/S on the other. In a fourth example, a stainless steel ring/Au wire ring/MgO disc were thermocompression bonded into a hermetic sealed joint leak tight to about 10$^{-8}$ SCC/S in a helium leak check. The process parameters for this fourth example were applying a pressure of 54–80 kg/cm$^2$ (768–1138 psi) at 1025° C. for about 30–105 minutes depending on the size of components, then allowing the joint to cool to room temperature inside an induction furnace in an argon gas environment.

Additional specific examples of hermetically sealed joints according to the present invention will now be described.

EXAMPLE 1

A thermocompression seal was made with gold-nickel alloy (82 weight % Au, 18 weight % Ni) as the intermediate wire ring between molybdenum and SiAlON ceramic. The thermocompression was done at 950° C. under pressure of 150 kg/cm$^2$ for 60 minutes. The seal was helium leak-proof at 10$^{-9}$ scc/s. The seal was tight after three weeks at 424° C. in iron disulfide (FeS$_2$) electrolyte and lithium aluminum (LiAl)/electrolyte mixtures. The bonding temperature may be lowered to 920° C. by metalizing the ceramic surface using PVD deposit of three successive layers of titanium (0.5 μm), nickel (0.5 μm) and gold (0.5 μm).

EXAMPLE 2

A thermocompression seal was made with aluminum as the intermediate wire ring between molybdenum and ceramic. Five ceramic materials were used: silicon carbide, SiAlON, Silicon nitride (Si$_3$N$_4$), magnesia (MgO), and alumina (Al$_2$O$_3$). Silicon Nitride (AlN) could also be used. The thermocompression was done at less than 580° C. (575° C. is an example) to avoid cracks at the molybdenum/ aluminum interface. The pressure applied was 150 kg/cm$^2$ for 30 minutes. The thermocompression was performed in a vacuum environment of 0.10 mbar vacuum. The seal was helium leak-proof at 10$^{-9}$ scc/s. Seals with SiC and Si$_3$N$_4$ (or SiAlON) were tight after three weeks at 425° C. in iron disulfide (FeS$_2$)/electrolyte mixture.

While the invention has been disclosed by way of its preferred embodiments and specific examples, it will be appreciated that various changes can be made to the disclosed examples without departing from the spirit and scope of the invention as defined in the appended claims.

What is claimed is:

1. A high temperature lithium-based battery having at least one cell having hermetically sealed seal, said cell comprising:

an insulating material (100) forming at least a portion of a cell enclosure;

a first member (102) of an electrically conductive material forming a bottom of said cell enclosure;

a first thermocompression seal (104) securing said first member (102) to said insulating material (100);

a second member (106,106') of electrically conductive material forming a top of said cell enclosure, said second member forming at least a portion of a bottom of a further cell enclosure; and a second thermocompression seal (104') securing said second member to said insulating material.

2. A battery according to claim 1, wherein said first thermocompression seal comprises Al, Au or Ni.

3. A battery according to claim 1, wherein said insulating material comprises any one of Aluminum Nitride (AlN), SiAlON, silicon nitride (Si$_3$N$_4$), MgO and Al$_2$O$_3$.

4. A battery according to claim 1, wherein said first thermocompression seal is a Au—Ni alloy.

5. A battery according to claim 4, wherein said alloy comprises 82 weight percent Au and 18 weight percent Nickel.

6. A battery according to claim 1, wherein said first member comprises molybdenum.

7. A battery according to claim 1, wherein said first member comprises a substrate coated with a material selected from the group consisting of TiN, WC and Mo.

8. A battery cell according to claim 1, wherein said insulating material comprises any one of SiAlON, silicon nitride (Si$_3$N$_4$), MgO and Al$_2$O$_3$.

9. A battery according to claim 1, wherein said second member comprises an electrically conductive ring (106) and a metal plate (106') fixed to said ring.

10. A battery according to claim 1, wherein said ceramic includes metallized surfaces facing each of said first and second thermocompression seals.

11. A battery according to claim 10, wherein each of said first and second thermocompression seals comprises at least partially nickel.

* * * * *